United States Patent
Welch et al.

[11] Patent Number: 5,825,741
[45] Date of Patent: Oct. 20, 1998

[54] OPTICAL DISC PLAYER WITH MOLDED DIFFRACTIVE OPTICAL ELEMENTS

[75] Inventors: William H. Welch; Robert D. Te Kolste; Michael R. Feldman, all of Charlotte, N.C.

[73] Assignee: Digital Optics Corporation, Charlotte, N.C.

[21] Appl. No.: 677,521

[22] Filed: Jul. 10, 1996

Related U.S. Application Data

[62] Division of Ser. No. 381,169, Jan. 31, 1995, Pat. No. 5,728,324.

[51] Int. Cl.$^6$ .............................. G11B 7/00; B29D 11/00
[52] U.S. Cl. ............................................ 369/112; 264/2.5
[58] Field of Search .................................... 369/110, 109, 369/112, 94; 264/1.33, 1.1, 2.5, 1.32; 425/808, 810

[56] References Cited

U.S. PATENT DOCUMENTS

| | | | |
|---|---|---|---|
| 4,607,914 | 8/1986 | Fienup | 350/320 |
| 4,793,953 | 12/1988 | Maus | 264/2.5 |
| 4,818,045 | 4/1989 | Chang | 350/3.7 |
| 4,830,441 | 5/1989 | Chang | 350/3.7 |
| 4,879,167 | 11/1989 | Chang | 428/215 |
| 4,895,790 | 1/1990 | Swanson et al. . | |
| 4,902,100 | 2/1990 | Reynolds et al. | 350/320 |
| 4,960,311 | 10/1990 | Moss et al. . | |
| 4,981,332 | 1/1991 | Smith | 350/3.6 |
| 5,013,494 | 5/1991 | Kubo et al. . | |
| 5,071,208 | 12/1991 | Chang | 359/10 |
| 5,071,597 | 12/1991 | D'Amato et al. . | |
| 5,073,007 | 12/1991 | Keomi et al. . | |
| 5,083,850 | 1/1992 | Mallik et al. | 359/1 |
| 5,105,049 | 4/1991 | Chang | 350/3.81 |
| 5,116,548 | 5/1992 | Mallik et al. | 264/1.3 |
| 5,119,231 | 6/1992 | Nelson et al. | 359/359 |
| 5,122,903 | 6/1992 | Aoyama et al. | 369/109 X |
| 5,124,815 | 6/1992 | Chang | 359/10 |
| 5,162,927 | 11/1992 | Moss et al. | 369/3 |
| 5,200,253 | 4/1993 | Yamaguchi et al. | 428/195 |
| 5,218,471 | 6/1993 | Swanson et al. | 359/565 |
| 5,227,897 | 7/1993 | Fohrman et al. . | |
| 5,227,915 | 7/1993 | Grossinger et al. . | |
| 5,229,797 | 7/1993 | Futhey et al. . | |
| 5,243,449 | 9/1993 | Smith | 359/13 |
| 5,243,583 | 9/1993 | Ohuchida et al. | 369/44.12 |
| 5,298,366 | 3/1994 | Iwasaki et al. | 430/321 |
| 5,345,544 | 9/1994 | Iwasaki et al. | 395/140 |
| 5,446,565 | 8/1995 | Kemma et al. | 369/94 X |
| 5,538,674 | 7/1996 | Nisper et al. . | |

FOREIGN PATENT DOCUMENTS 4-339330  11/1992  Japan ..................................... 369/109

OTHER PUBLICATIONS

Oct. 1994 Edition of Laser Focus World; "Diffraction Optics Move into the Commercial Arena"; M.R. Feldman Oct. 1994.

Feb./Mar. 1994, San Dimas, CA, Newspaper Article "Innovative Lens Focus of Company's Future" by Randyl Drummer Feb. 1994.

*Primary Examiner*—Paul W. Huber
*Attorney, Agent, or Firm*—Jones & Volentine, L.L.P.

[57] ABSTRACT

A method of fabricating a diffractive optical element includes the steps of: etching a negative of a desired multi-level diffraction pattern onto a molding surface of a quartz master element using photolithography, assembling the master element as a portion of a mold, and injecting a plastic molding composition into the mold and against the molding surface of the master element to injection mold a diffractive optical element whereby the optical element has the desired diffraction pattern on its surface. The diffraction pattern is preferably formed on the quartz master using VLSI photolithography.

18 Claims, 3 Drawing Sheets

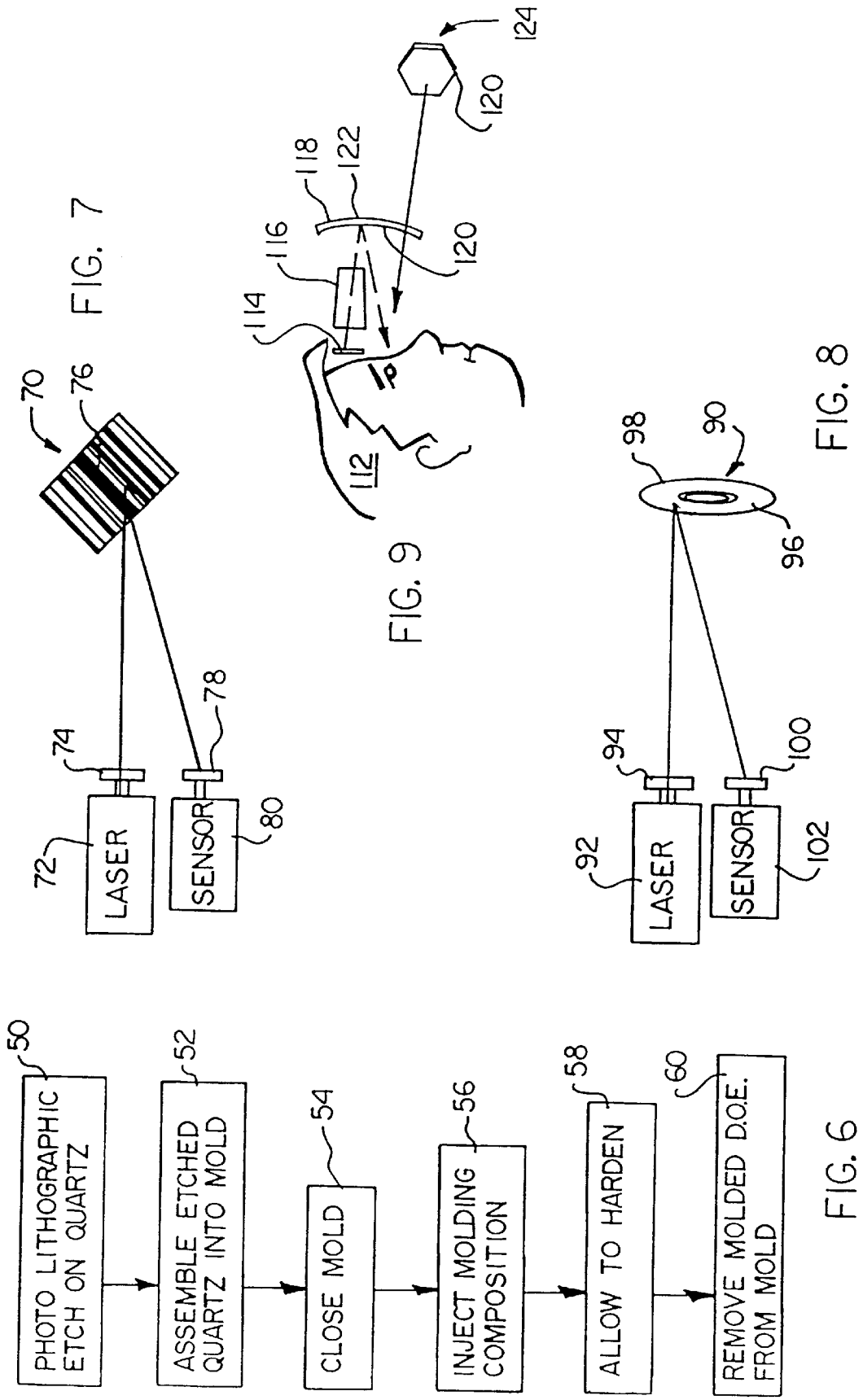

OPTICAL DISC PLAYER WITH MOLDED DIFFRACTIVE OPTICAL ELEMENTS

This application is a division of application Ser. No. 08/381,169, filed Jan. 31, 1995, now U.S. Pat. No. 5,728,324.

BACKGROUND OF THE INVENTION

The present invention relates to improvements in optical elements and their manufacture, particularly optical elements having diffractive features on at least one side.

Diffractive optics technology is becoming more and more prevalent in a wide number of optical system applications including high resolution imaging systems such as head-mounted displays, focusing and collimating optics for fiber optic couplers and connectors and other optical interconnect applications.

One type of diffractive optical element known as a "natural hologram" is fabricated by creating interference among coherent light beams on a photographic plate and then developing the photographic plate. An example of such a hologram may be seen in U.S. Pat. No. 4,607,914 by Fienup entitled "Optical Systems and Design Techniques Using Holographic Optical Elements." These natural holograms, however, are difficult to mass-produce.

In order to overcome the mass production problems with such holograms, computer-generated holograms (CGH's) have been developed. CGH's have been fabricated by calculating the desired holographic pattern to perform a particular function and then forming the pattern on a glass or other substrate using photolithographic or other techniques. This technique is described, for example, in U.S. Pat. No. 4,960,311 by Moss et al., entitled "Holographic Exposure System for Computer-Generated Holograms."

When natural holograms are used to replace conventional refractive optical elements such as lenses and prisms, they are typically referred to as holographic optical elements (HOE's). In order to distinguish HOE's from CGH's when CGH's are used to replace similar refractive elements, they are typically referred to as diffractive optical elements (DOE's).

While natural holograms are conventionally analog in nature, CGH's, on the other hand, are conventionally digital in nature. That is, the calculation of the CGH is often done by calculating a CGH pattern at discrete locations, often referred to as "pixels" and quantizing phase and amplitude functions to discrete levels. This is done principally to simplify the fabrication of CGH's. For example, in U.S. Pat. No. 4,895,790 by Swanson et al., entitled "High Efficiency, Multi-Level, Diffractive Optical Elements," a method is described for fabricating CGH's containing $2^N$ and phase levels, where capital "N" is the number of masks and etching steps employed. This is usually referred to as the "photolithographic" method.

Some DOE's are formed by diamond turning, and details of diamond turning manufacturing can be obtained from "Diffractive Optics Move into the Commercial Arena" by Michael R. Feldman, in *Laser Focus World*, October 1994. The disclosure of that article is hereby incorporated herein by reference.

Diamond turning results in a continuous DOE rather than a multi-level DOE. This is, when a blazed grating is desired, the blaze in each period is formed in a smooth manner as opposed to the staircase approximation of multi-level DOE's. Although a continuous pattern is preferred, methods that enable the fabrication of continuous patterns do not have many of the advantages of photolithography. For example, with diamond turning the number of fringes than can be fabricated is typically limited to a few hundred or less. Also the smallest grating period than can be fabricated is typically limited to 5–20 microns.

The photolithographic technique, on the other hand, allows the incorporation of thousands more fringes in the DOE, with grating periods as small as 1–2 microns.

Direct-write photolithographic techniques can also be used to fabricate multi-level DOE's (as opposed to the conventional photolithographic technique described in U.S. Pat. No. 4,895,790). With direct-write photolithography (also described in the *Laser Focus World* article), instead of using masks, an electron-beam or a laser is used to directly expose the photoresist to the desired level. By elimination of the masks, cost savings and better alignment can, in theory, be achieved. However, to date, this technique has not been as commonly employed commercially as the conventional photolithographic technique, in part due to the less accurate control of etch depth with this technique.

However, fabrication of individual DOE's by diamond turning or by photolithographic techniques is a very slow and expensive process.

But photolithography can also be used to manufacture large numbers of DOE's simultaneously. While this can lower the cost of DOE's in many cases, it still typically results (depending on the application) in many more cases in DOE's that are much more expensive than plastic refractive lenses, especially for lenses larger than 0.25 to 0.5 inches in diameter.

The reason for the relatively high cost of photolithographic manufacturing stems in part from the high cost of the materials involved. For example, a 1 inch diameter precision plastic refractive lens may sell for less than $1–$5 per lens, which can be more than the cost of the materials for a comparable DOE lens fabricated with the photolithography lens. The most common substrate material used with the photolithographic method is a type of glass such as quartz (silicon dioxide) with is referred to in the U.S. Pat. No. 4,895,790 . Typical cost for a double-sided polished quartz substrate is approximately $3.50 per square inch.

Another way of forming DOE's is shown in U.S. Pat. No. 5,013,494. That patent shows a method of using a slanted ion beam milling. This gives a continuous blaze function, but the blaze must be in one direction only. That is, it requires straight line gratings, and a blaze angle cannot change.

DOE's function somewhat differently than HOE's. HOE's are usually thick, which gives them Bragg selectivity. Bragg selectivity means that there is a very high diffraction efficiency at one particular angle, known as the "Bragg angle" for one particular wavelength. Light of other wavelengths and/or other angles passes through the hologram unaffected. Bragg selectivity requires that the holograms be thick. Thickness will therefore mean that the gratings have information other than just on the surface; that is, they are three-dimensional structures, rather than two-dimensional structures.

DOE's have the advantage that they can mass-produced, either with photolithography techniques or embossing. Thick HOE's, however, cannot be mass-produced, so they are much more expensive than DOE's in large quantities. Thin DOE's are often replicated by embossing.

Replication of DOE's by embossing has similar drawbacks to the photolithographic mass production techniques. For high precision DOE embossing replication, sturdy, polished transparent substrates are needed (otherwise, warping or distortion can occur). Typically, a glass such as quartz is employed, resulting is material costs comparable to that of photolithography.

Plastic injection molding of refractive components is well-known to those skilled in the art. Often, a master refractive element is manufactured by diamond turning. The master can be diamond turned directly in a metal such as nickel or steel. This metal master can then be machined so that it can be bolted into the mold. Alternatively, the master can be made in a less machinable material such as quartz. The quartz master can then be converted to a nickel master through the well-known electroforming process.

However, mass-production of DOE's, particularly multi-level DOE's, on a low cost basis has not heretofore been possible. There continues to be a need for manufacturing techniques such as injection molding that can be used to generate large quantities of DOE's inexpensively.

SUMMARY OF THE INVENTION

The present invention fulfills this need in the art by providing a method of fabricating a diffractive optical element including the steps of assembling a master element with the negative of a desired diffraction pattern on a molding surface as a portion of a mold, and injecting a molding composition into the mold and against the molding surface of the master element to injection mold a diffractive optical element, whereby the optical element has the desired diffraction pattern on its surface. The providing step may take the form of providing the diffraction pattern as a multi-level diffractive. The assembling step may include providing the master element of quartz.

The method may include the preliminary step of etching the negative of the desired diffraction pattern onto the master element using photolithography. Typically, the injecting step comprises injecting a plastic material.

The invention also provides a method of fabricating diffractive optical elements including the steps of providing a first master element with a mold surface configured with the negative of a desired diffractive pattern and an obverse surface; providing a second master element with a mold surface configured with the negative of a desired diffractive pattern or refractive shape and an obverse surface; aligning the master elements so that their respective mold surfaces face each other in an injection molding machine; injecting suitable substrate material into the injection molding machine to form an injection molded diffractive optical element having a diffraction pattern on one side and a diffraction pattern or refractive shape on the other side, whereby a diffractive optical element or a hybrid diffractive/refractive element can be produced having the characteristics of low cost and high performance.

One or both of the providing steps may take the form of providing the diffraction pattern as a multi-level diffractive. Also, one or both of the providing steps comprises providing the master element of quartz.

The method may further include the preliminary step of etching the negative of the desired diffraction pattern onto at least one of the master elements using photolithography.

Preferably, the injecting step is performed by injecting a plastic substrate material.

The providing steps may proceed as providing at least one of the first and second master elements with alignment cavities on their obverse surfaces and the aligning step could then take the form of inserting alignment pins into the alignment cavities, the alignment pins being affixed to the injection molding machine.

The providing steps may include providing the first and second master elements with alignment cavities on the obverse surfaces and the aligning step may include inserting alignment pins into the alignment cavities and into cavities in the injection molding machine, so that the master elements are thereby aligned with each other.

The invention also provides an optical element including an injection molded item having a surface and a multi-level diffraction pattern molded on the surface. Preferably, the element is composed of a plastic material. In one embodiment the multi-level diffraction pattern is a computer generated hologram.

The invention also provides an optical element formed by injection molding having a first surface and a second surface wherein the first surface and the second surface contain a multi-level diffraction pattern. In an alternate embodiment the first surface is configured as a multi-level diffraction pattern and the second surface is shaped to refract light.

The invention also provides an injection molding pin having an alignment pin affixed on its surface, whereby the alignment pin may be received snugly into an alignment cavity in an injection mold to permit precise positioning of the injection mold. Alternatively, the invention provides an injection molding pin having one or more alignment cavities on its surface, whereby alignment nub are received snugly into the alignment cavity or cavities to permit precise positioning of an injection mold attached or in communication with the alignment nub.

The invention further provides a mold master for molding optical elements, the mold master having first and second sides, the first side being suitable to impart a relief on a molded optical element having diffractive optical features and being formed on the mold master by photolithography. The diffractive optical features typically cover a majority of the first side and have individual sizes on the order of 1 micron.

The digital optical elements may be used in various end uses, including head-mounted displays, bar code scanners and compact disc players having suitable light sources and sensors, where the digital optical element serves as a lens between the light source and the sensor.

BRIEF DESCRIPTION OF THE DRAWINGS

The invention will be better understood after a reading of the Detailed Description of the Preferred Embodiments and a review of the drawings in which:

FIG. 6 is a flow chart of the process of making an optical element according to a preferred embodiment;

FIG. 7 is a schematic view of a bar code scanner according to an embodiment of the invention;

FIG. 8 is a schematic view of a compact disc player according to an embodiment of the invention; and FIG. 9 is a schematic view of a head mounted display according to an embodiment of the invention.

DETAILED DESCRIPTION OF THE PREFERRED EMBODIMENTS

Figure 1:
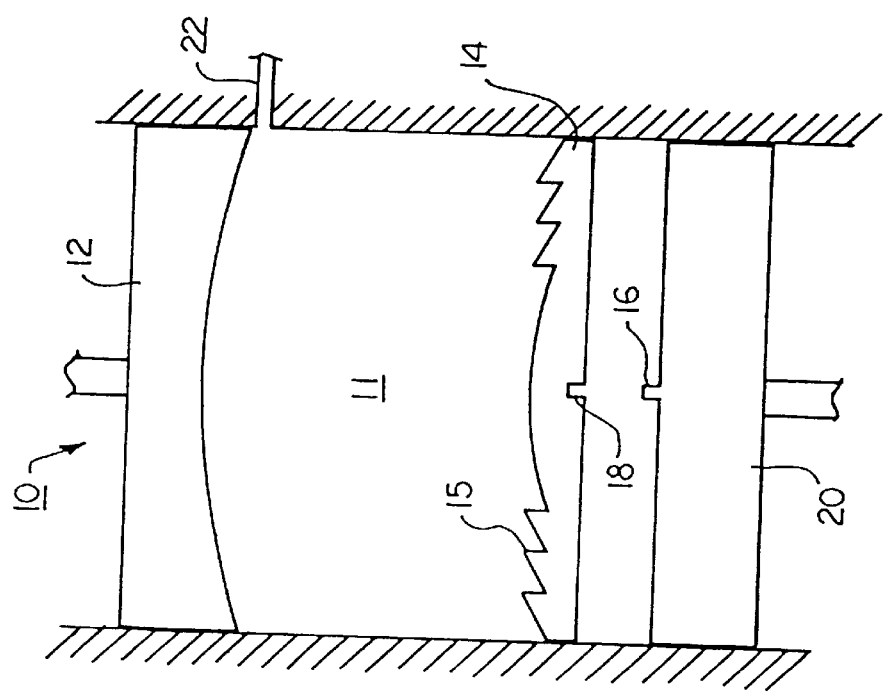
FIG. 1 is a schematic sectional view through a mold equipped with a master according to an embodiment of the invention.

The present invention, as noted, provides for the low-cost manufacture of optical elements having diffractive surfaces by injection molding. A schematic diagram of a suitable injection molding machine is shown in FIG. 1. Most of the molding machine 10 is conventional, having a molding cavity 11 in which the optical element is molded. A molding pin 20 may be caused to reciprocate within the molding cavity 11 to close for molding and to open for retrieval of molded articles. One or more injection ports 22 are positioned suitably as to be available to inject molten material to the cavity 11 for forming the optical element when the molding pin 20 is closed.

Diffractive mold element 14 is mounted on molding pin 20. A hole 18 is formed in the lower side of the diffractive mold element 14 for receipt of a centering pin 16 formed on the molding pin 20.

An upper end of the cavity 11 is bounded by a refractive mold element 12. The refractive mold element can be of any desired refractive curvature. The mold element 12 may be positive or negative, as desired, to form a molded lens surface that suitably cooperates with the surface by diffractive mold element 14. Alternatively, the refractive mold element 12 could be substituted with a diffractive mold element similar to diffractive mold element 14.

The diffractive mold element 14 has features 15 on its upper surface which are the negative relief image of the element to be made. As such, it is a negative of the diffractive features to be molded and will have minimum feature sizes on the order of 1 micron. Typically, the diffractive optical features cover a majority of the side of a element formed by the diffractive master. Other feature sizes minimums as small as one-half micron or smaller are also contemplated. Larger features may, of course, also be molded. The diffractive mold element 14 has those features 15 formed on it using VLSI photolithographic techniques taught in U.S. Pat. No. 5,218,471 to Swanson et al. and U.S. Pat. No. 4,895,790 to Swanson et al., both of which are incorporated herein by reference.

As is well-known to those skilled in the art, the refractive mold element 12 would be bolted onto a molding pin located at the upper portion of FIG. 1, or would be directly machined into the molding pin at the upper portion of FIG. 1, at the opposite end of the cavity from molding pin 20. The diffractive mold element 14 is attached to molding pin 20. In the preferred embodiment, this is achieved by mechanical restraining of the diffractive mold element 14 with a metal plate that is bolted to molding pin 20.

The photolithographic technique can also be used to mark a reference mark on the element 14, which can, in turn, be used to precisely locate a mark for the hole 18. The hole 18 can be made by photolithographic techniques or other suitable techniques.

The centering pin 16 and hole 18 cooperate to assure that the diffractive mold element 14 does not move in relation to molding pin 20, even during periods of rapid temperature change, as will be experienced during molding. As will be appreciated, the molten plastic injected through injector 22 will be of high temperature and therefore cause high temperature gradients and rapid thermal contraction and expansion. The central alignment of the hole 18 and pin 16 permit such thermal effects to take place without distorting the relationships of the features 15 on the surface of the diffractive mold element 14. The centering pin 16 and hole 18 are preferable to a peripheral clamping arrangement for the element 14, which can lead to breakage of the mold element 14 if the thermal expansion differences between the clamps and the mold element are too great.

The diffractive mold element 14 is preferably made of quartz and manufactured according to the techniques of Swanson et al. discussed above. However, any other suitable material can be used. Quartz is preferred as the master element for several reasons. It does not soften under high temperatures and pressures and it has a very low coefficient of thermal expansion. Also, it can be easily patterned with photolithography.

Although diamond turning can be used to fabricate a diffractive structure in a metal, such as nickel or steel, for use in injection molding, it is much more difficult to fabricate a multi-level diffractive in such materials. The materials most commonly employed with the photolithographic and other multi-level techniques are quartz and silicon. Furthermore, since multi-level DOE's typically have much smaller minimum feature sizes than continuous DOE's, they typically are much more sensitive to distortion of the diffraction pattern due to thermal expansions and contractions. Therefore, it s desirable to have an insulator for the substrate with a low coefficient of thermal expansion, such as quartz, rather than metals (which have high coefficients of thermal expansions). However, multi-level DOE's also tend to have greater requirements on alignment between sides in dual sided elements, thus suggesting the need for machinable master substrates such as nickel or steel.

Quartz has been used as a master for the fabrication of a blazed grating DOE in U.S. Pat. No. 5,013,494. However, in this case, it was easier to use quartz since only a single surface was fabricated, thereby eliminating the need for alignment.

This invention solves this dilemma by using the quartz master, fabricated directly by photolithography in the mold. The master is attached to the pin with a novel alignment technique than can achieve precise alignment despite the mismatch in thermal coefficients between the DOE master and rest of the molding cavity.

Although a mechanical constraint is necessary in this invention to keep the mold element 14 from separating from the molding pin 20, the mechanical constraint can be loosely bolted to the pin 20 to allow for thermal expansion mismatches.

Figure 2:
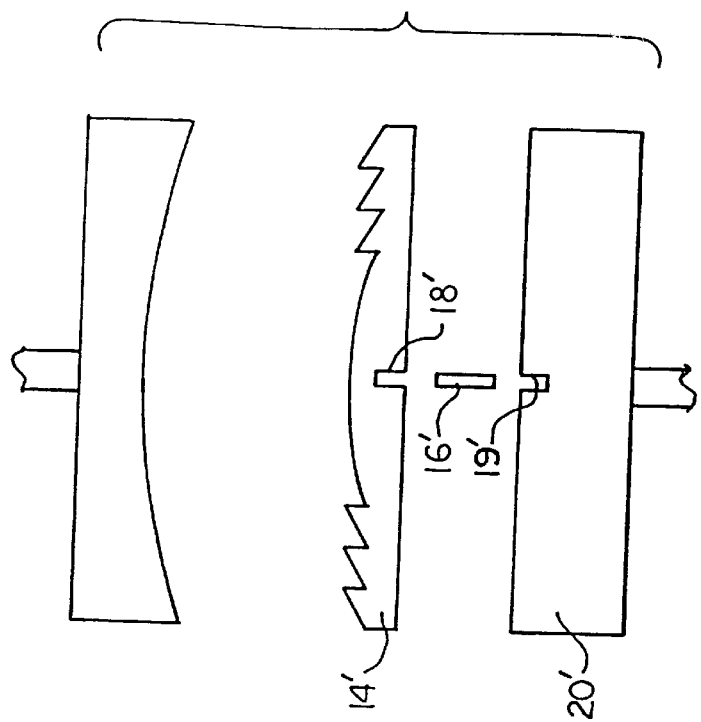
FIG. 2 is a schematic sectional view through a mold equipped with a master according to another embodiment of the invention.

FIG. 2 shows an alternate molding machine embodiment in which the molding pin 20', instead of having fixed pin 16, has a hole 19' formed in it. The diffractive mold element 14 has a hole 18' comparable to the hole 18 of FIG. 1. A separate centering pin 16' engages the holes 18' and 19' to center the master on the molding pin.

It can be appreciated that the shapes of the pins and holes for either FIG. 1 or FIG. 2 need not be cylindrical, and are preferably somewhat tapered outwardly from the midportion of the pin to its extremes in order to help to define the centering of the master element on the molding pin. Also, the pin 16 or 16' can be elongated in one radial direction to be more in the form of an upstanding plate, with the holes 19', 18' or (in the case of FIG. 1, hole 18) may be elongated in a cooperating fashion. This configuration would prevent rotation of the master element 14 with respect to the molding pin 20, should that be desired.

Figure 5:
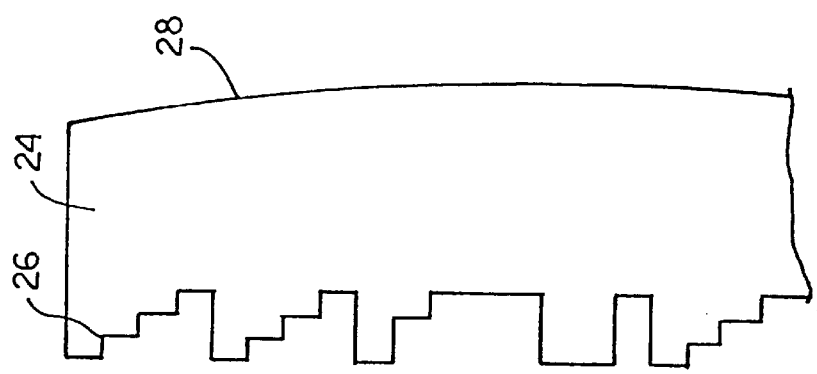
FIG. 5 is a schematic, greatly enlarged, sectional view of a schematic representation of the top of a digital optical element having multi-level diffractives on one side and a refractive surface on the other side.

The molding elements 14 and 12 shown in FIGS. 1 and 2 can be used to make an optical element similar to lens 24 shown in FIG. 5. The lens 24 has a refractive surface 28 and a diffractive surface 26 in opposing relation. The specific refractive and diffractive surface shapes will be dictated by the desired optical result.

Figure 4:
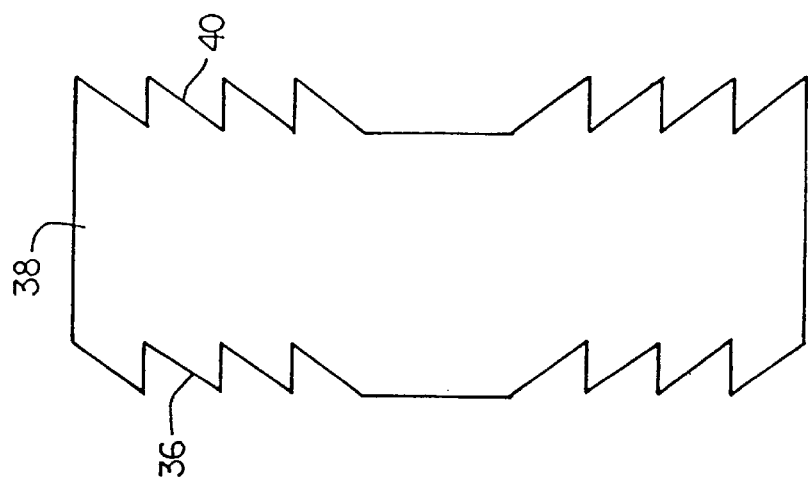
FIG. 4 is a schematic, greatly enlarged, sectional view of a schematic representation of the top of a digital optical element having multi-level diffractives on two sides, where one is the conjugate of the other.
Figure 3:
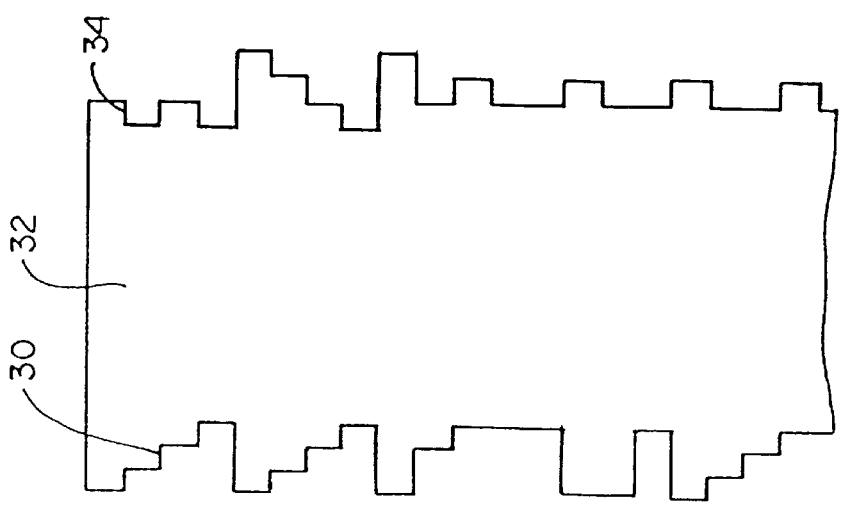
FIG. 3 is a schematic, greatly enlarged, sectional view of a schematic representation of the top of a digital optical element having multi-level diffractives on two sides.

FIG. 3 shows a plastic lens 32 having diffractive surfaces 30,34 on the two active sides. Similarly, FIG. 4 shows a plastic lens 38 molded with diffractive surfaces 36,40. A blaze pattern shown in FIG. 4 is useful for some results where the multilevel diffractive pattern shown in FIGS. 5 and 3 are shown in other applications.

Of particular importance in the molding of optical elements according to the invention is the use of a diffractive pattern on at least one side of the optical element, either formed by a VLSI photolithographic technique or some other technique (such as electron direct-write or laser exposure direct-write) to result in a multilevel diffractive structure as shown, for example, as the side 30 of FIG. 3. Those of ordinary skill in the art can ascertain the exact shape desired for a given application.

FIG. 6 is flow chart of various steps used in formation of the optical elements in accordance with a preferred embodiment of the invention. In step 50, the quartz master 14 is photolithographically etched using the techniques of Swanson et al., or any other suitable photolithographic technique. The fabricated quartz master is then assembled at step 52 into the molding machine 10. At step 54, the mold is closed and the molding composition injected at step 56. A typical molding composition will be a plastic, such as acrylic, ABS, or any other suitable optical quality plastic material.

The plastic is allowed to harden in step 58 and the molded optical element is removed from the mold at step 60.

Optical elements made according to the method can be used for a wide variety of end uses. As shown in FIG. 7, DOE's 70, 78 may be provided as part of a bar code scanner 70. The bar code scanner 70 includes a laser 72, the output of which passes through DOE 74 to focus on a bar code 76. The reflected light from the bar code 76 can be adjusted as desired with a DOE 78 and sensed by a sensor 80.

As shown in FIG. 8, DOE's 94, 100 can be used as part of a compact disc reading apparatus 90. The apparatus 90 includes a laser 92 which transmits a laser through DOE 94 for reflection off of a compact disc 96 supported by a compact disc support 98. The reflected light passes through DOE 100 and is sensed by sensor 102 in conventional fashion. Of course, this same technique may be used in other optical disc players such as video disc players, CD-ROM players and "floptical" disc players.

FIG. 9 shows the use of a DOE 118 as a combiner for a head-mounted display. The head-mounted display includes a video image display 114. Other optical components 116 focus the light emanating from the display 114 on the combiner 118. Optical elements made in accordance with the procedures described above may be included in the optical component 116. The use of such plastic items helps keep the weight of the head mounted display to a minimum. Generally, plastic refractive lenses are more dispersive than glass refractives. Hybrid diffractive, refractive components can be used to make lightweight plastic optical components with much less dispersion.

The combiner 118 is formed to have a surface 120 which has diffractive elements but is also reflective, so that the image on the display 114 is reflected back to the eye of viewer 112. However, the diffractive elements on the combiner 118 can be used to modify the perception of the display, such as to make the viewer 112 see the image being displayed as taking place at perhaps a site 124. In addition, the combiner 118 has an outer surface 122 which is substantially transparent, so that light reflected off of a remote item 120 passes through the combiner 118 to the eye 112. A suitable surface can be molded on the outside surface 122 of the combiner 118 so that, as the light passes from the item 120 to the viewer 112, distorting effects of the diffractive elements on the surface 120 are cancelled by complementary diffractive elements on the side 122. Typically, the diffractive elements on the side 122 will be the conjugate of the elements on the side 120 or a pattern close to the conjugate.

It will be appreciated by those of ordinary skill in the art that the methods described herein can be extended beyond the specifics described with respect to FIGS. 1 and 2. That is, various combinations of refractive and diffractive surfaces can be put on an optical element molded according to the molding technique depending upon its desired use, by simply suitably configuring the mold masters. As noted in Swanson et al., the pattern is usually formed as a computer-generated hologram.

What is claimed is:

1. An optical disc player comprising:

a laser;

a lens receiving emissions from said laser, said lens including an injection molded item having a surface and a diffraction pattern having multiple discrete levels molded on said surface, said diffraction pattern being molded using a non-metallic, photolithographically generated master element;

an optical disc support to position an optical disc to reflect laser emissions output from said lens; and a sensor to receive the reflected emissions.

2. The optical disc player of claim 1 wherein said lens is a plastic material.

3. The optical disc player of claim 1 wherein the multi-level diffraction pattern is a computer generated hologram.

4. The optical disc player of claim 1, wherein said molding of said diffractive pattern includes compensating for thermal mismatch between the master element and adjacent portions of an injection molding machine.

5. An optical disc player as claimed in claim 1 wherein said lens has been made by:

fabricating a negative of a desired diffraction pattern on a molding surface of a master element using photolithography, assembling the master element with the molding surface as a portion of a mold, and injecting a molding composition into the mold and against the molding surface of the master element to injection mold a diffractive optical element as said lens, whereby the optical element has the desired diffraction pattern on its surface.

6. The optical disc player of claim 5 wherein the diffraction pattern on the negative is a multi-level diffractive.

7. The optical disc player of claim 5 wherein the master element is quartz.

8. The optical disc player of claim 5 wherein said fabricating step comprises etching the negative of the desired diffraction pattern onto the master element using photolithography.

9. The optical disc player of claim 5 wherein said lens is a plastic material.

10. The optical disc player of claim 5 wherein the multi-level diffraction pattern is a computer generated hologram.

11. An optical disc player comprising:

a laser;

a lens receiving emissions from said laser, said lens being formed by injection molding having a first surface and a second surface wherein the first surface and the second surface each have a diffraction pattern having multiple discrete levels molded thereon using a non-metallic, photolithographically generated master element;

an optical disc support to position an optical disc to reflect laser emissions from said lens; and a sensor to receive the reflected emissions.

12. The optical disc player of claim 11 wherein said lens is a plastic material.

13. The optical disc player of claim 11 wherein the multi-level diffraction patterns are computer generated holograms.

14. The optical disc player of claim 11, wherein said molding of said diffractive pattern includes compensating for thermal mismatch between the master element and adjacent portions of an injection molding machine.

15. An optical disc player comprising:

a laser;

a lens receiving emissions from said laser, said lens being formed by injection molding having a first surface and a second surface wherein the first surface has a diffraction pattern having multiple discrete levels molded thereon using a non-metallic, photolithographically generated master element and the second surface is shaped to refract light, an optical disc support to position an optical disc to reflect laser emissions from said lens; and a sensor to receive the reflected emissions.

16. The optical disc player of claim 15 wherein said lens is a plastic material.

17. The optical disc player of claim 15 wherein the multi-level diffraction pattern is a computer generated hologram.

18. The optical disc player of claim 15, wherein said molding of said diffractive pattern includes compensating for thermal mismatch between the master element and adjacent portions of an injection molding machine.

* * * * *